(12) United States Patent
Schaffer et al.

(10) Patent No.: US 7,721,310 B2
(45) Date of Patent: May 18, 2010

(54) METHOD AND APPARATUS FOR SELECTIVE UPDATING OF A USER PROFILE

(75) Inventors: J. David Schaffer, Wappingers Falls, NY (US); Kwok Pun Lee, Yorktown Heights, NY (US); Kaushal Kurapati, Yorktown Heights, NY (US); Srinivas Gutta, Buchanan, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1112 days.

(21) Appl. No.: 09/730,205

(22) Filed: Dec. 5, 2000

(65) Prior Publication Data

US 2002/0104087 A1     Aug. 1, 2002

(51) Int. Cl.
H04N 5/445 (2006.01)
H04H 60/33 (2008.01)
H04H 60/32 (2008.01)

(52) U.S. Cl. .............................. 725/46; 725/9; 725/13; 725/14

(58) Field of Classification Search .................. 725/46, 725/14, 16, 20, 13, 9
See application file for complete search history.

(56) References Cited

U.S. PATENT DOCUMENTS

| | | | | |
|---|---|---|---|---|
| 4,745,549 A | * | 5/1988 | Hashimoto | 705/8 |
| 5,323,240 A | * | 6/1994 | Amano et al. | 348/731 |
| 5,410,344 A | * | 4/1995 | Graves et al. | 725/46 |
| 5,550,576 A | * | 8/1996 | Klosterman | 725/46 |
| 5,585,865 A | * | 12/1996 | Amano et al. | 725/14 |
| 5,652,613 A | * | 7/1997 | Lazarus et al. | 725/50 |
| 5,704,017 A | * | 12/1997 | Heckerman et al. | 706/12 |
| 5,731,844 A | * | 3/1998 | Rauch et al. | 725/40 |
| 5,758,257 A | * | 5/1998 | Herz et al. | 725/116 |
| 5,798,785 A | * | 8/1998 | Hendricks et al. | 725/46 |
| 5,801,747 A | * | 9/1998 | Bedard | 725/46 |
| 5,812,124 A | * | 9/1998 | Eick et al. | 725/45 |
| 5,867,226 A | * | 2/1999 | Wehmeyer et al. | 725/46 |
| 5,867,799 A | * | 2/1999 | Lang et al. | 707/1 |
| 5,945,988 A | * | 8/1999 | Williams et al. | 345/747 |
| 5,977,964 A | | 11/1999 | Williams et al. | 345/327 |
| 5,978,766 A | * | 11/1999 | Luciw | 705/1 |
| 5,991,734 A | * | 11/1999 | Moulson | 705/10 |
| 6,005,597 A | * | 12/1999 | Barrett et al. | 725/46 |
| 6,052,554 A | | 4/2000 | Hendricks et al. | 455/5.1 |

(Continued)

FOREIGN PATENT DOCUMENTS

WO     9748230     12/1997

OTHER PUBLICATIONS

U.S. Appl. No. 60/172,595.*

Primary Examiner—Dominic D Saltarelli
Assistant Examiner—Chris Parry

(57) ABSTRACT

A television programming recommender is disclosed that selectively obtains feedback information from a user to update one or more profiles associated with the user. Previously obtained implicit and explicit preferences are utilized to selectively focus the collection of feedback information to further update and refine the implicit and explicit preferences. The present invention obtains feedback from a user in a manner that maximizes the value of the obtained information and improves the performance of the television programming recommender. The present invention automatically requests feedback from the user upon the occurrence of predefined criteria. The nature of the requested feedback, and the manner in which the obtained feedback is used to adjust a profile, can vary.

31 Claims, 8 Drawing Sheets

U.S. PATENT DOCUMENTS

| | | | |
|---|---|---|---|
| 6,133,909 A * | 10/2000 | Schein et al. | 345/721 |
| 6,182,287 B1 * | 1/2001 | Schneidewend et al. | 725/48 |
| 6,317,881 B1 * | 11/2001 | Shah-Nazaroff et al. | 725/24 |
| 6,370,513 B1 * | 4/2002 | Kolawa et al. | 705/10 |
| 6,389,593 B1 * | 5/2002 | Yamagishi | 725/9 |
| 6,400,996 B1 * | 6/2002 | Hoffberg et al. | 700/83 |
| 6,418,440 B1 * | 7/2002 | Kuo et al. | 707/10 |
| 6,425,128 B1 * | 7/2002 | Krapf et al. | 725/37 |
| 6,434,747 B1 * | 8/2002 | Khoo et al. | 725/46 |
| 6,438,579 B1 * | 8/2002 | Hosken | 709/203 |
| 6,438,752 B1 * | 8/2002 | McClard | 725/46 |
| 6,490,724 B1 * | 12/2002 | Ha et al. | 725/9 |
| 6,594,825 B1 * | 7/2003 | Goldschmidt Iki et al. | 725/53 |
| 6,604,239 B1 * | 8/2003 | Kohen | 725/13 |
| 6,611,958 B1 * | 8/2003 | Shintani et al. | 725/58 |
| 6,637,029 B1 * | 10/2003 | Maissel et al. | 725/46 |
| 6,668,278 B1 * | 12/2003 | Yen et al. | 709/218 |
| 6,681,393 B1 * | 1/2004 | Bauminger et al. | 725/23 |
| 6,721,954 B1 * | 4/2004 | Nickum | 725/46 |
| 6,757,691 B1 * | 6/2004 | Welsh et al. | 707/104.1 |
| 6,826,552 B1 * | 11/2004 | Grosser et al. | 706/47 |
| 6,831,663 B2 * | 12/2004 | Chickering et al. | 715/700 |
| 6,871,186 B1 * | 3/2005 | Tuzhilin et al. | 705/26 |
| 6,937,994 B1 * | 8/2005 | Iyengar | 705/10 |
| 7,164,450 B2 * | 1/2007 | Lamb | 348/734 |
| 2001/0044739 A1 * | 11/2001 | Bensemana | 705/10 |
| 2002/0029384 A1 * | 3/2002 | Griggs | 725/46 |
| 2002/0046402 A1 * | 4/2002 | Akinyanmi et al. | 725/34 |
| 2002/0053077 A1 * | 5/2002 | Shah-Nazaroff et al. | 725/13 |
| 2002/0053083 A1 * | 5/2002 | Massey | 725/46 |
| 2002/0054752 A1 * | 5/2002 | Wood et al. | 386/83 |
| 2002/0104081 A1 * | 8/2002 | Candelore et al. | 725/9 |
| 2002/0199186 A1 * | 12/2002 | Ali et al. | 725/28 |
| 2002/0199194 A1 * | 12/2002 | Ali | 725/46 |
| 2003/0056216 A1 * | 3/2003 | Wugofski et al. | 725/46 |

\* cited by examiner

EXPLICIT VIEWER PROFILE 500

| | FEATURE 540 | NUMERICAL (OR SYMBOLIC) REPRESENTATION 550 |
|---|---|---|
| 505 | CHANNEL 2 | 3 |
| 506 | CHANNEL 4 | 4 |
| 507 | CHANNEL 7 | 3 |
| 508 | .... | |
| 509 | SPORTS CHANNEL | 7 |
| .... | MUSIC CHANNEL | 2 |
| | .... | |
| 510 | MORNING PROGRAMS | 1 |
| 511 | EARLY AFTERNOON PROGRAMS | 3 |
| 512 | LATE AFTERNOON PROGRAMS | 7 |
| 513 | EVENING PROGRAMS | 5 |
| | ... | |

FIG. 5

IMPLICIT VIEWER PROFILE 600

| | FEATURE 640 | POSITIVE COUNTS 645 | NEGATIVE COUNTS 650 |
|---|---|---|---|
| 605 | TOTAL PROGRAMS | 45 | 45 |
| 606 | CHANNEL 2 | 10 | 0 |
| 607 | CHANNEL 4 | 3 | 1 |
| 608 | CHANNEL 7 | 4 | 4 |
| | .... | | |
| 609 | SPORTS CHANNEL | 10 | 0 |
| .... | MUSIC CHANNEL | 1 | 0 |
| | .... | | |
| 610 | MORNING PROGRAMS | 2 | 2 |
| 611 | EARLY AFTERNOON PROGRAMS | 1 | 2 |
| 612 | LATE AFTERNOON PROGRAMS | 10 | 0 |
| 613 | EVENING PROGRAMS | 6 | 4 |
| | ... | | |

FIG. 6

PROFILE INFLUENCE RULE DATABASE 700

| | RULE CRITERIA 750 |
|---|---|
| 705 | PROGRAM IS WATCHED HAVING FEATURES THAT DO NOT MATCH PROFILE(S) |
| 706 | PROGRAM IS WATCHED HAVING A LOW PROGRAM RECOMMENDATION SCORE |
| 707 | PROGRAM RECEIVES HIGH SCORE BUT IS NOT WATCHED IN FAVOR OF PROGRAM(S) RECEIVING LOWER PROGRAM RECOMMENDATION SCORE(S) |
| 708 | NEUTRAL RECOMMENDATION SCORE IS GENERATED BY PROGRAM RECOMMENDER |
| ... | |
| 709 | CONFLICTING RECOMMENDATION SCORES ARE GENERATED BY IMPLICIT AND EXPLICIT PROGRAM RECOMMENDERS |

FIG. 7

METHOD AND APPARATUS FOR SELECTIVE UPDATING OF A USER PROFILE

FIELD OF THE INVENTION

The present invention relates to methods and apparatus for making recommendations to a user, such as recommendations of television programming, and more particularly, to techniques for selectively updating the user profiles that are utilized to generate such recommendations.

BACKGROUND OF THE INVENTION

As the number of channels available to television viewers has increased, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, it has become increasingly difficult to effectively identify desirable television programs using such printed guides.

More recently, television program guides have become available in an electronic format, often referred to as electronic program guides (EPGs). Like printed television program guides, EPGs contain grids listing the available television programs by time and date, channel and title. Some EPGs, however, allow television viewers to sort or search the available television programs in accordance with personalized preferences. In addition, EPGs allow for on-screen presentation of the available television programs.

While EPGs allow viewers to identify desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs or sports programming. Thus, the viewer preferences can be applied to the EPG to obtain a set of recommended programs that may be of interest to a particular viewer.

Thus, a number of tools have been proposed or suggested for recommending television programming. The TiVO™ system, for example, commercially available from Tivo, Inc., of Sunnyvale, Calif., allows viewers to rate shows using a "Thumbs Up and Thumbs Down" feature and thereby indicate programs that the viewer likes and dislikes, respectively. Thereafter, the TiVo receiver matches the recorded viewer preferences with received program data, such as an EPG, to make recommendations tailored to each viewer.

Implicit television program recommenders generate television program recommendations based on information derived from the viewing history of the viewer, in a non-obtrusive manner. FIG. 1 illustrates the generation of a viewer profile 240 using a conventional implicit television program recommender 160. The implicit viewer profile 140 is derived from a viewing history 125, indicating whether or not a given viewer watched each program. As shown in FIG. 1, the implicit television program recommender 160 processes the viewing history 225, in a known manner, to derive an implicit viewer profile 140 containing a set of inferred rules that characterize the preferences of the viewer. Thus, an implicit television program recommender 160 attempts to derive the viewing habits of the viewer based on the set of programs that the viewer watched or did not watch.

Explicit television program recommenders, on the other hand, explicitly question viewers about their preferences for program features, such as title, genre, actors, channel and date/time, to derive viewer profiles and generate recommendations. FIG. 2 illustrates the generation of a viewer profile 240 using a conventional explicit television program recommender 260. The explicit viewer profile 240 is generated from a viewer survey 225 that provides a rating for each program feature, for example, on a numerical scale that is mapped to various levels of interest between "hates" and "loves," indicating whether or not a given viewer watched each program feature. As shown in FIG. 2, the explicit television program recommender 260 processes the viewer survey 225, in a known manner, to generate an explicit viewer profile 240 containing a set of rules that implement the preferences of the viewer.

While such television program recommenders identify programs that are likely of interest to a given viewer, they suffer from a number of limitations, which if overcome, could further improve the quality of the generated program recommendations. For example, explicit television program recommenders typically do not adapt to the evolving preferences of a viewer. Rather, the generated program recommendations are based on the static survey responses. In addition, to be comprehensive, explicit television program recommenders require each user to respond to a very detailed survey. For example, assuming there are 180 different possible values for the "genre" feature, and the user merely specifies his or her "favorite five genres," then no information is obtained about the user's preferences for the other 175 possible genres. Similarly, implicit television program recommenders often make improper assumptions about the viewing habits of a viewer that could have easily been identified explicitly by the viewer.

A need therefore exists for a method and apparatus for updating the user profiles that are utilized to generate the recommendations.

SUMMARY OF THE INVENTION

Generally, a television programming recommender is disclosed that selectively obtains feedback from a user to update one or more profiles for a given user. Previously obtained implicit and explicit preferences are utilized to selectively focus the collection of feedback information to further update and refine the implicit and explicit preferences. The present invention obtains feedback from a user in a manner that maximizes the value of the obtained information and improves the performance of the television programming recommender. In addition, the present invention reduces the obtrusive nature of the feedback query.

The present invention automatically requests feedback from the user upon the occurrence of predefined criteria. For example, feedback can be requested to update the profile(s) if (i) viewing behavior is inconsistent with information recorded in a profile or with generated program recommendation scores; (ii) a neutral recommendation score (neither a positive or negative recommendation) is generated by an implicit or explicit program recommenders; (iii) conflicting recommendation scores are generated by the implicit and explicit program recommenders; or (iv) any combination of the foregoing. The predefined criteria can be compared in real-time (or offline) to the generated recommendation scores and/or viewing behavior to automatically trigger the request for feedback information.

In addition, the present invention allows the nature of the requested feedback to vary, as well as how such feedback should be employed to update the profile(s). In one implementation, the user is requested to rate a program (i) being watched (or not watched) that appears inconsistent with information in the profile(s) or an assigned program recommendation score, or (ii) has been assigned a neutral or conflicting recommendation score by the implicit and/or explicit program recommenders.

In one embodiment, the requested feedback is stored in a log file, referred to herein as a "feedback request list," for subsequent presentation to the user. A feedback control process coordinates the timing and the number of feedback requests that are presented to the user from the feedback request list during a given feedback request session in order to (i) minimize the obtrusive nature of the requests, (ii) maximize the quality of the obtained feedback information, or (iii) a combination of the foregoing.

Based on the indicated feedback, the present invention determines whether to adjust the information contained in the explicit or implicit viewer profile (or both), and by how much. The user-supplied program rating that is received in response to the feedback request can be, for example, a score indicating the strength of the user's like or dislike of the program. The user-supplied program rating can be used to update the implicit profile, as if the user had watched the program. In addition, if the user-supplied program rating satisfies predefined criteria, such as exceeding a minimum threshold, the program itself can be added to the explicit profile. In a further variation, the user can have the option of updating any conflicting information in the explicit profile 500 that triggered the feedback request.

A more complete understanding of the present invention, as well as further features and advantages of the present invention, will be obtained by reference to the following detailed description and drawings.

BRIEF DESCRIPTION OF THE DRAWINGS

FIG. 5 is a table illustrating an exemplary explicit viewer profile of FIG. 3;

FIG. 6 is a table illustrating an exemplary implicit viewer profile of FIG. 3;

FIG. 7 is a sample table from the profile influence rules database of FIG. 3;

DETAILED DESCRIPTION

Figure 1:
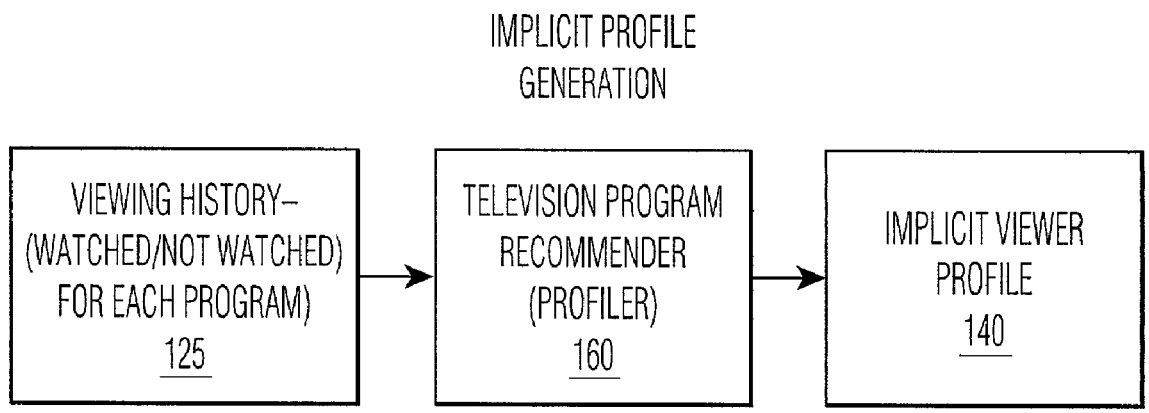
FIG. 1 illustrates the generation of an implicit profile using a conventional implicit television program recommender.
Figure 2:
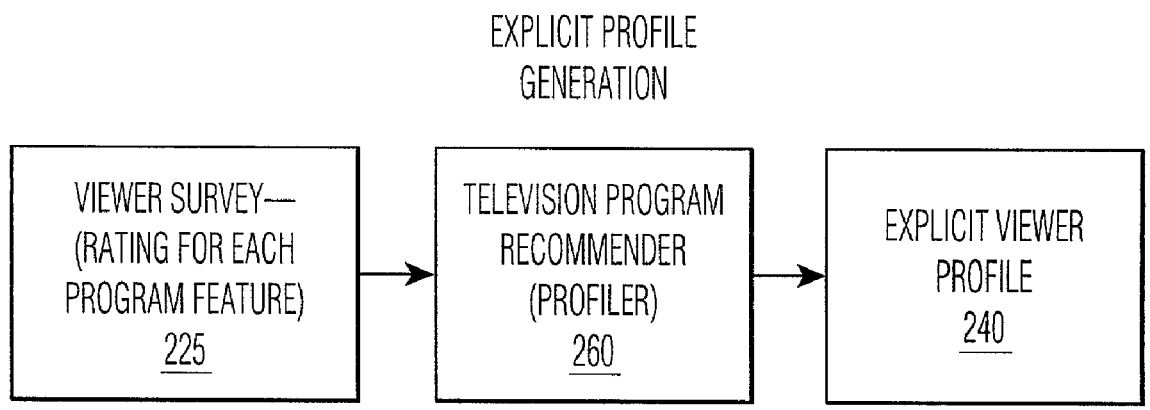
FIG. 2 illustrates the generation of an explicit profile using a conventional explicit television program recommender.
Figure 3:
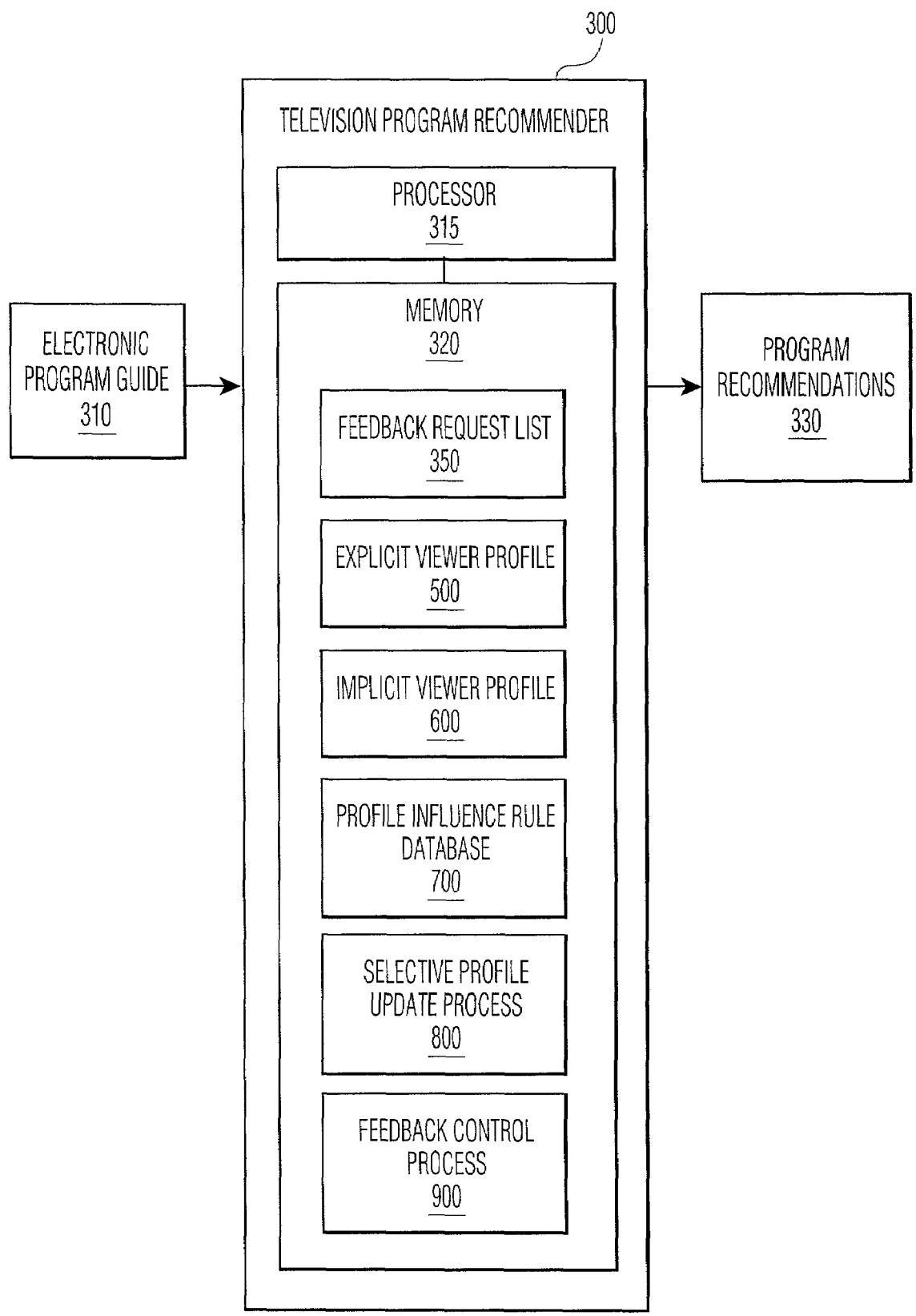
FIG. 3 is a schematic block diagram of the television program recommender in accordance with the present invention.

FIG. 3 illustrates a television programming recommender 300 in accordance with the present invention. As shown in FIG. 3, the television programming recommender 300 evaluates each of the programs in an electronic programming guide (EPG) 310 to identify programs of interest to a particular viewer. The set of recommended programs can be presented to the viewer, for example, using a set-top terminal/television (not shown) using well known on-screen presentation techniques. While the present invention is illustrated herein in the context of television programming recommendations, the present invention can be applied to any automatically generated recommendations that are based on a behavior history, such as a viewing history or purchase history.

Figure 4:
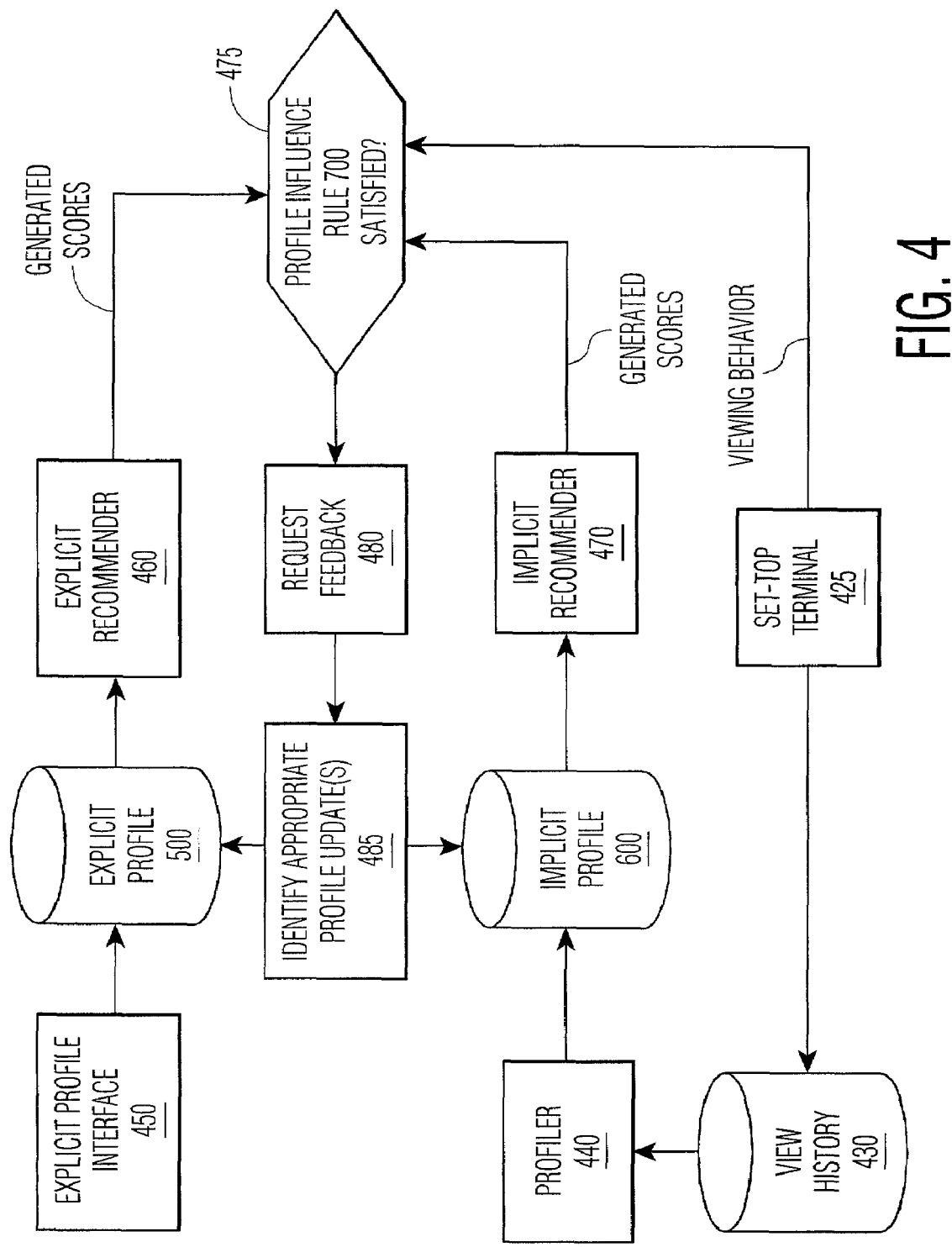
FIG. 4 is a schematic diagram illustrating the process flow of a television program recommender in accordance with the present invention.

FIG. 4 provides a schematic diagram of the television programming recommender 300 from a process point of view. As shown in FIG. 4, each viewer uses an explicit profile interface 450 to rate their preferences for various program features, including, for example, days and viewing times, channels, actors, and categories (genres) of television programs. The user-supplied explicit preferences are used to generate an explicit profile 500, discussed further below in conjunction with FIG. 5. The explicit profile 500 is, in turn, utilized to generate program recommendation scores by an explicit program recommender 460, in a known manner.

Likewise, an implicit profile 600, discussed further below in conjunction with FIG. 6, is derived by a profiler 440 from a viewing history 430, indicating whether or not a given viewer watched programs with each program feature. The viewing history 430 is obtained from a set-top terminal 425 that monitors the viewing behavior of the user. The implicit profile 600 is, in turn, utilized to generate program recommendation scores by an implicit program recommender 470, in a known manner.

According to one feature of the present invention, the television programming recommender 300 selectively obtains feedback from a user to update the implicit or explicit viewer profiles 500, 600 (or both) for a given user. Generally, previously obtained implicit and explicit preferences are utilized to selectively focus the collection of feedback information to update such implicit and explicit preferences. Thus, the television programming recommender 300 can obtain feedback from a user in a manner that maximizes the value of the obtained information and thereby improves the performance of the television programming recommender 300, while minimizing the obtrusive nature of the feedback query.

In one implementation, the present invention employs profile influence rules 700, discussed below in conjunction with FIG. 7, during step 475 that are operable to automatically request feedback from the user upon the occurrence of predefined criteria, such as specified events. As discussed below in conjunction with FIG. 7, the established profile influence rules 700 may determine the timing and nature of the feedback that is requested from a user during step 480, and how such feedback should be employed to update the profile(s) 500, 600 during step 485. Based on the indicated feedback, the television programming recommender 300 can determine whether to adjust the information contained in the explicit or implicit viewer profile 500, 600 (or both), and by how much.

As discussed further below in conjunction with FIGS. 8 and 9, the feedback requested during step 480 can be requested immediately upon the detection of an appropriate feedback trigger condition, or the feedback request can be logged in a feedback request list 350 (FIG. 3) for subsequent processing to minimize the obtrusive nature of the requests or to maximize the quality of the obtained feedback information (or both).

The profile influence rules 700 of the present invention may request feedback to update the profile(s) 500, 600, for example, if (i) viewing behavior is inconsistent with information recorded in a profile or with generated program recommendation scores; (ii) a neutral recommendation score (neither a positive or negative recommendation) is generated by an implicit or explicit program recommenders; (iii) conflicting recommendation scores are generated by the implicit and explicit program recommenders; or (iv) any combination of the foregoing. For example, viewing behavior can be inconsistent with profile information or generated program recommendation scores if, e.g., (i) a program is watched having features that do not match the profile(s) 500, 600; a program is watched that was assigned a low program recommendation score; or (iii) a program receives a high program recommendation score but is not watched in favor of one or more program(s) receiving lower program recommendation scores.

As shown in FIG. 4, once the profile influence rules 700 are established, the profile influence rules may be compared in real-time (or offline) during step 475 to the generated recommendation scores and/or viewing behavior, as well as other factors, in order to automatically determine the applicability of one or more of the profile influence rules 700. Each profile influence rule 700 may comprise the predefined criteria specifying the conditions under which the profile influence rule should be initiated, and, optionally, a feedback request command defining the appropriate information that should be requested in order to influence the profile(s).

In the illustrative embodiment described herein, the feedback request command requests the user to rate a program (i) being watched (or not watched) that appears inconsistent with information in the profile(s) 500, 600 or an assigned program recommendation score, or (ii) has been assigned a neutral or conflicting recommendation score by the implicit and/or explicit program recommenders. The feedback request may optionally indicate the program recommendation score assigned to the program and identify one or more program features that significantly contributed to the program recommendation score (for, example, the top-N contributing program features).

The user-supplied program rating that is received in response to the feedback request can be, for example, a score indicating the strength of the user's like or dislike of the program. The user-supplied program rating can be used to update the implicit profile 600 in a well-known manner, as if the user had watched the program. In addition, if the user-supplied program rating satisfies predefined criteria, such as exceeding a minimum threshold, the program itself can be added to the explicit profile 500. In other words, an entry can be added to the explicit profile 500 in the form of {if title="program_name" then assigned score=user-supplied program rating} In a further variation, the user can have the option of updating any conflicting information in the explicit profile 500 that triggered the feedback request.

Thus, as shown in FIG. 3, the television programming recommender 300 includes a feedback request list 350 which may be, for example, a log file containing a list of feedback requests accumulated by the television programming recommender 300. In addition, the television programming recommender 300 includes the explicit viewer profile 500, the implicit viewer profile 600, each discussed further below in conjunction with FIGS. 5 and 6, respectively, and a profile influence rule database 700, discussed further below in conjunction with FIG. 7, containing the profile influence rules.

In addition, a selective profile update process 800 and a feedback control process 900, are discussed further below in conjunction with FIGS. 8 and 9, respectively. Generally, the selective profile update process 800 compares the profile influence rules 700 to, e.g., the generated recommendation scores and/or viewing behavior, and populates the feedback request list 350 with an appropriate feedback request when a given profile influence rule 700 is triggered. The feedback control process 900 coordinates the timing and the extent of the feedback requests that are presented to the user from the feedback request list 350 during a given feedback session to minimize the obtrusive nature of the requests or to maximize the quality of the obtained feedback information (or both).

The television program recommender 300 may be embodied as any computing device, such as a personal computer or workstation, that contains a processor 315, such as a central processing unit (CPU), and memory 320, such as RAM and ROM. In addition, the television programming recommender 300 may be embodied as any available television program recommender, such as the Tivo™ system, commercially available from Tivo, Inc., of Sunnyvale, Calif., or the television program recommenders described in U.S. patent application Ser. No. 09/466,406, filed Dec. 17, 1999, entitled "Method and Apparatus for Recommending Television Programming Using Decision Trees,", U.S. patent application Ser. No. 09/498,271, filed Feb. 4, 2000, entitled "Bayesian TV Show Recommender," and U.S. patent application Ser. No. 09/627,139, filed Jul. 27, 2000, entitled "Three-Way Media Recommendation Method and System,", or any combination thereof, as modified herein to carry out the features and functions of the present invention.

FIG. 5 is a table illustrating an exemplary explicit viewer profile 500. As shown in FIG. 5, the explicit viewer profile 500 contains a plurality of records 505-513 each associated with a different program feature. In addition, for each feature set forth in column 540, the viewer profile 500 provides a numerical representation in column 550, indicating the relative level of interest of the viewer in the corresponding feature. As discussed below, in the illustrative explicit viewer profile 500 set forth in FIG. 5, a numerical scale between 1 ("hate") and 7 ("love") is utilized. For example, the explicit viewer profile 500 set forth in FIG. 5 has numerical representations indicating that the user particularly enjoys programming on the Sports channel, as well as late afternoon programming.

In an exemplary embodiment, the numerical representation in the explicit viewer profile 500 includes an intensity scale such as:

| Number | Description |
| --- | --- |
| 1 | Hates |
| 2 | Dislikes |
| 3 | Moderately negative |
| 4 | Neutral |
| 5 | Moderately positive |
| 6 | Likes |
| 7 | Loves |

FIG. 6 is a table illustrating an exemplary implicit viewer profile 600 corresponding to the same viewer as the explicit viewer profile 600, discussed above. As shown in FIG. 6, the implicit viewer profile 600 contains a plurality of records 605-613 each associated with a different program feature. In addition, for each feature set forth in column 640, the implicit viewer profile 600 provides the corresponding positive and negative counts, in a known manner, in columns 645 and 650, respectively, indicating the number of times the viewer watched and did not watch, respectively, programs having each feature. For each positive and negative program example (i.e., programs watched and not watched), a number of program features are classified in the user profile 600. For example, if a given viewer watched a given sports program ten times on Channel 2 in the late afternoon, then the positive counts associated with these features in the implicit viewer profile 600 would be incremented by 10, and the negative counts would be 0 (zero). Since the implicit viewing profile 500 is based on the user's viewing history, the data contained in the profile 500 is revised over time, as the viewing history grows.

FIG. 7 illustrates an exemplary table of the profile influence rule database 700 that records each of the profile influence rules that dynamically obtain user feedback and adjust the profile(s) 500, 600, if the predefined criteria for initiating the profile influence rule is satisfied. Each profile influence rule 700 may comprise the predefined criteria specifying the conditions under which the profile influence rule should be initiated, and, optionally, a feedback request command defining the appropriate feedback that should be requested in order to influence the profile(s). In illustrative embodiment, the default feedback request queries the user to rate a program (i) being watched (or not watched) that appears inconsistent with information in the profile(s) 500, 600 or an assigned program recommendation score, or (ii) has been assigned a neutral or conflicting recommendation score by the implicit and/or explicit program recommenders. The feedback request may optionally indicate the program recommendation score assigned to the program and identify one or more program features that significantly contributed to the program recommendation score (for, example, the top-N contributing program features).

As shown in FIG. 7, the exemplary profile influence rule database 700 maintains a plurality of records, such as records 705-709, each associated with a different profile influence rule. For each profile influence rule, the profile influence rule database 700 identifies the rule criteria in field 750. In a further variation of the profile influence rule database 700, an additional field (not shown) can be included to record the corresponding feedback request that should be implemented for a given satisfied rule.

Figure 8:
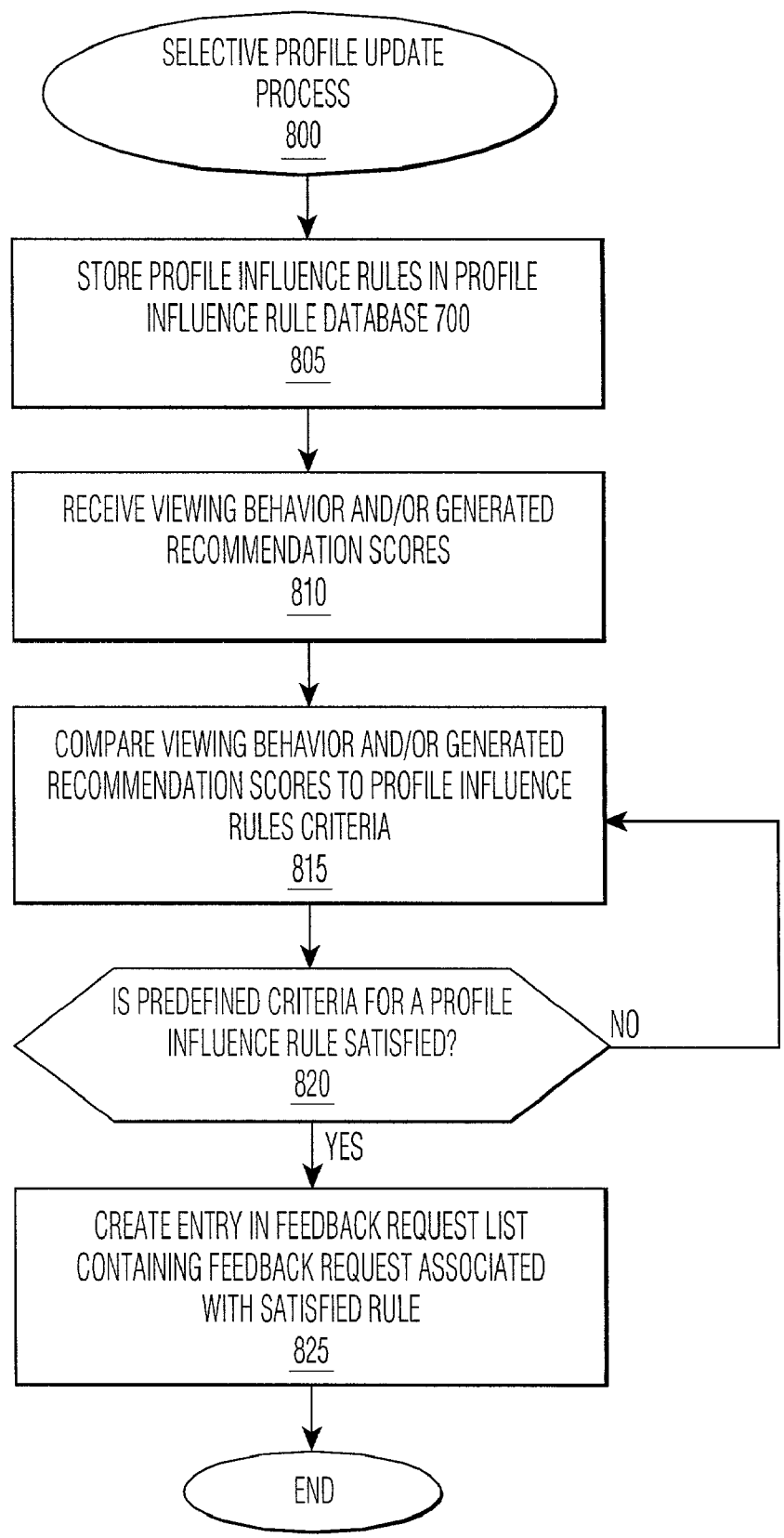
FIG. 8 is a flow chart describing the selective profile update process of FIG. 3 embodying principles of the present invention.

FIG. 8 is a flow chart describing the selective profile update process 800 embodying principles of the present invention. As previously indicated, the television programming recommender 300 implements the selective profile update process 800 to monitor viewing behavior and generated recommendation scores, and determine whether the predefined criteria associated with any profile influence rule is satisfied. As previously indicated, each profile influence rule may comprise (i) predefined criteria specifying the conditions under which the profile influence rule should be initiated, and (ii) a profile feedback request command defining the appropriate response that should be implemented in order to influence the profile (s). The feedback request command may be a query to obtain feedback from the user (that in turn can be used to adjust the information in the profile(s) 500, 600), or an appropriate adjustment to information in the profile(s) 500, 600. Thus, once the predefined criteria of a given profile influence rule is satisfied, the selective profile update process 800 will implement the corresponding profile feedback request command to influence the profile(s) in the desired manner.

Thus, as shown in FIG. 8, the selective profile update process 800 initially stores the profile influence rules in the profile influence rule database 700 during step 805. As previously indicated, the profile influence rules are operable to automatically request feedback from the user upon the occurrence of predefined criteria.

In addition, the selective profile update process 800 receives the viewing behavior and/or generated recommendation scores during step 810. Thereafter, the selective profile update process 800 compares the received viewing behavior and/or generated recommendation score data to the profile influence rules criteria recorded in the profile influence rule database 700 during step 815. It is noted that the comparison performed during step 815 may be executed periodically, continuously, or at irregular intervals.

A test is performed during step 820 to determine if the predefined criteria for at least one profile influence rule is satisfied. If it is determined during step 820 that the predefined criteria for at least one profile influence rule is not satisfied, then program control returns to step 815 to continue evaluating the received viewing behavior and/or generated recommendation score data in the manner described above.

If, however, it is determined during step 820 that the predefined criteria for at least one profile influence rule is satisfied, then an entry is created in the feedback request list 350 containing the corresponding feedback request during step 825. As discussed further below in conjunction with FIG. 9, the frequency with which feedback requests are presented to the user from the feedback request list 350 and the number of feedback requests that are presented to the user during a given feedback session can be controlled to minimize the obtrusive nature of the requests or to maximize the quality of the obtained feedback information (or both).

For example, in the illustrative embodiment the default feedback request command queries the user to rate a program (i) being watched (or not watched) that appears inconsistent with information in the profile(s) 500, 600 or an assigned program recommendation score, or (ii) has been assigned a neutral or conflicting recommendation score by the implicit and/or explicit program recommenders. The feedback request may optionally indicate the program recommendation score assigned to the program and identify one or more program features that significantly contributed to the program recommendation score (for, example, the top-N contributing program features).

Timing and Extent of Feedback Requests

It should be understood that the steps of the selective profile update process 800 may embody computer-readable code stored in the memory 320 of the television program recommender 300 of Fig. 3 causing the processor 315 to perform the steps of the selective profile update process 800. Alternatively, the steps of the selective profile update process 800 may embody computer-readable code stored in a computer-readable medium forming an article of manufacture, which, when loaded into the memory 320, causing the processor 315 to perform the steps of the selective profile update process 800.

As previously indicated, the frequency with which feedback requests are presented to the user from the feedback request list 350 and the number of feedback requests that are presented to the user during a given feedback session can be controlled to minimize the obtrusive nature of the requests or to maximize the quality of the obtained feedback information (or both).

Figure 9:
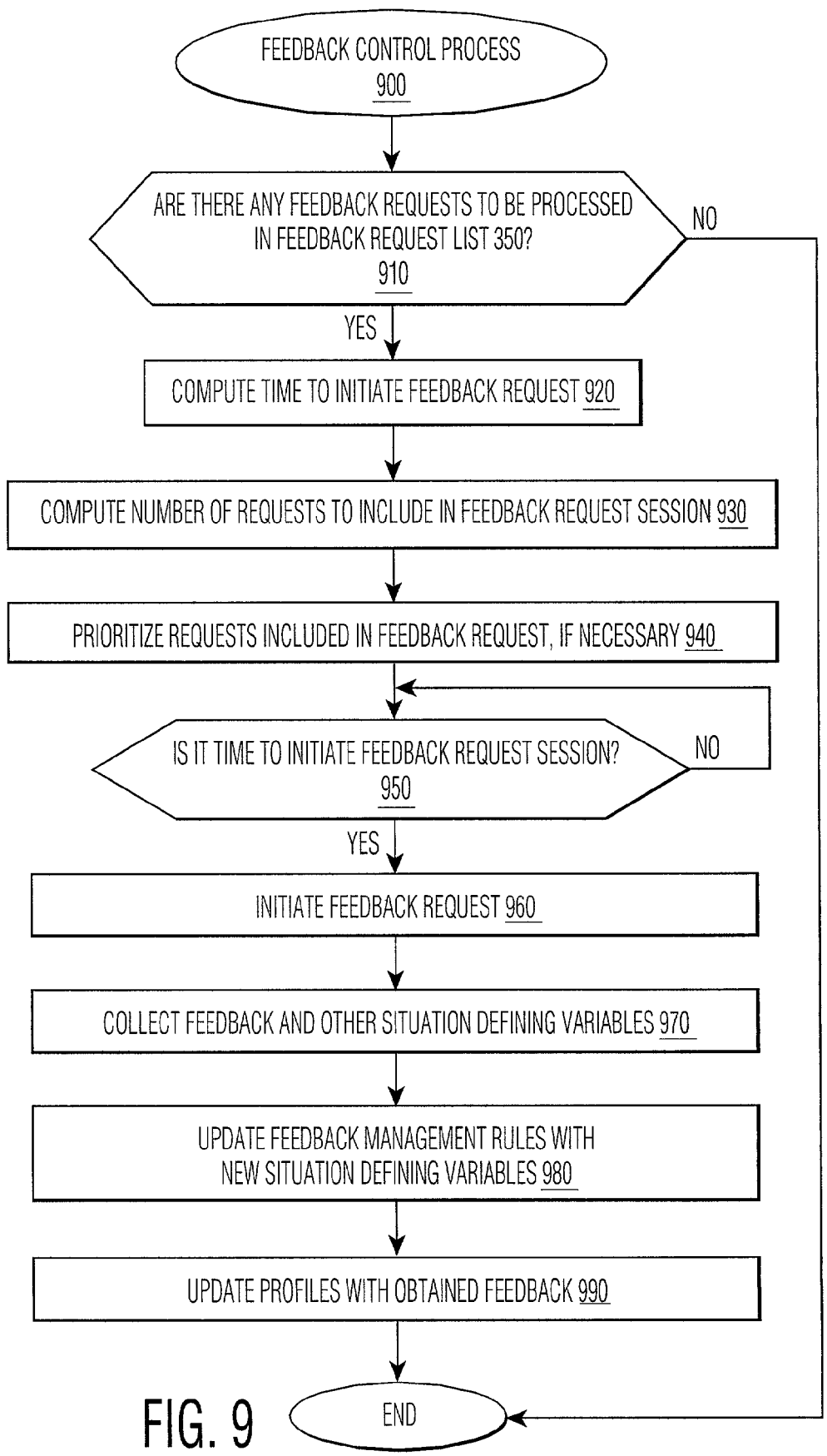
FIG. 9 is a flow chart describing the feedback control process of FIG. 3 embodying principles of the present invention.

FIG. 9 is a flow chart describing an exemplary feedback control process 900 that coordinates the timing and the extent of the feedback requests that are presented to the user from the feedback request list 350 during a given feedback session to minimize the obtrusive nature of the requests or to maximize the quality of the obtained feedback information (or both). In addition, the feedback control process 900 can improve its current knowledge by learning from the user reaction to each feedback session. As discussed hereinafter, the feedback control process 900 may employ a number of rules that control the timing and the extent of the feedback requests based on situation-defining parameters.

The rules and associated situation-defining parameters might specify, for example, (i) specific times and days when feedback should or should not be requested; (ii) the number of feedback requests to present during a given feedback request session; (iii) the duration of each feedback request session; and (iv) the minimum time that should separate any two feedback request sessions (i.e., a blackout time period). It is noted that times and days in the feedback gathering rules may be specified in terms of absolute values or relative to a current or future time or event, such as the next time the user powers up the device.

As discussed further below, the feedback gathering rules and/or associated situation-defining parameters can be specified, for example, by the user employing a menu-driven interface, or by an expert in human-machine interactions. Furthermore, the feedback gathering rules and/or associated situation-defining parameters can be predefined or dynamically determined, as discussed below. Generally, the feedback gathering rules and associated situation-defining parameters should be informed by research that make the interactions most tolerable to the human participants and most likely to produce good feedback information over time.

Furthermore, the television programming recommender 300 can be initiated with default values for the situation-defining variables based, for example, on user testing research, that can be modified over time in response to the user's reaction to the feedback gathering process.

As shown in FIG. 9, the feedback control process 900 initially determines if there are currently any feedback requests to be processed in feedback request list 350 during step 910. If it is determined during step 310 that there currently are no feedback requests in the feedback request list 350, then program control terminates. If, however, it is determined during step 310 that there are feedback requests in the feedback request list 350, then the feedback control process 900 computes the time to initiate each feedback request during step 920.

For example, the computed time can generally be conditioned on the presence of the user(s) associated with the profiles 500, 600. The presence of a user can be determined, for example, using well-known situation-awareness methods, such as cameras or heat sensors, or an inference that the user is present when the device is turned on.

In addition, the number of requests to include in each feedback request session is determined during step 930. If the number of requests to include in the session exceeds the number of requests in the feedback request list 350, each of which can vary with time, then the feedback requests are prioritized during step 940.

A test is performed during step 950 to determine if it is time to initiate a feedback request session. If it is determined during step 950 that it is not time to initiate a feedback request session, then program control returns to step 950 until the indicated time.

If, however, it is determined during step 950 that it is time to initiate a feedback request session, then the feedback request is initiated during step 960. The requested feedback and other situation defining variables, such as a flag indicating not to query the user for feedback, e.g., when other people are in the room, or when the user is on the phone, are collected during step 970.

Finally, the feedback management rules are updated during step 980 with the new situation defining variables and the appropriate user profile(s) 500, 600 are updated during step 990 with the obtained feedback. It is noted that the appropriate user profile(s) 500, 600 can be updated, for example, in accordance with the techniques described in U.S. patent application Ser. No. 09/627,139, filed Jul. 27, 2000, entitled "Three-Way Media Recommendation Method and System," assigned to the assignee of the present invention and incorporated by reference herein.

As previously indicated, the situation-defining variables used by the feedback control process 900 to determine the timing and the extent of the feedback requests can be predefined or dynamically determined. In one implementation, the television programming recommender 300 can be initiated with default values or user-specified values indicating how often feedback request session should be scheduled and how many feedback requests the user is willing to process during each feedback request session.

Thereafter, the television programming recommender 300 can employ a trial-and-error process to refine the initial values. For this approach, the situation-defining parameters can be considered random variables with some probability distribution that needs to be learned, or they may be considered fuzzy functions with confidence weightings.

For example, to determine how many shows to offer during a feedback session, a default position may treat this value as a normally distributed random variable with a mean of 10 and a range of +/−5. During each feedback request session, a random number will be selected from this distribution and that number of feedback requests will be presented to the user. Thereafter, the feedback request session may be terminated by the user in one of three ways: (i) responding to all requests for feedback and then stopping; (ii) terminating the session before responding to all requests (including a refusal to respond to any requests); or (iii) completing all requests for feedback and then requesting additional feedback requests. Whatever the outcome, an observed value of the random variable that the user determined is accumulated. Over time, these accumulated values are used by the television programming recommender 300 to compute a new probability distribution that more accurately reflects the tolerance of the specific user.

These collected observations may be further enhanced by collecting additional variables that characterize the situation when the observed value was collected. For instance, the day and time might be noted. This would permit modeling the number of shows as a multivariate distribution. A system using this method might learn, for example, that the user is willing to respond to more feedback requests on certain days of the week and/or during certain time periods. Similarly, if the genre of the tuned-in show is also noted, the system may learn that the user is willing to respond to more feedback requests when sitcoms are on than when the News is on. The system may also note the program title, so that it may learn that this user is usually willing to supply feedback at the end of a given program, but not at the beginning and generally not with other programs.

Considering parameters that govern the timing of a feedback request, the same methods can be applied. If technology for segmenting the broadcast is used, such as those techniques described, for example, in U.S. patent application Ser. No. 09/532,845, filed Mar. 21, 2000, entitled "System and Method for Automatic Content Enhancement of Multimedia Output Device," assigned to the assignee of the present invention and incorporated by reference herein, then the system might learn that feedback requests are more likely to be accepted if offered during the show broadcast itself.

It should be understood that the steps of the feedback control process 900 may embody computer-readable code stored in the memory of the television program recommender 300 of FIG. 3 causing the processor 315 to perform the steps of the feedback control process 99. Alternatively, the steps of the feedback control process may embody computer-readable code stored in a computer-readable medium forming an article of manufacture, which, when loaded into the memory 320, causing the processor 315 to perform the steps of the feedback control process 800.

It is to be understood that the embodiments and variations shown and described herein are merely illustrative of the principles of this invention and that various modifications may be implemented by those skilled in the art without departing from the scope and spirit of the invention.

What is claimed is:

1. A method for updating a user profile stored in a memory, comprising the steps of:
   obtaining, from the memory using a processor, said user profile indicating program content preferences of a user;
   comparing, using the processor, said preferences to program content of an item selection made by said user;
   generating program recommendation scores, using implicit/explicit recommenders, of content based on the preferences in the user profile;
   requesting feedback information from said user using a user interface if said selection is inconsistent with said preferences, wherein said feedback request includes an indication of said generated program recommendation score for the program content of said item selection that includes an identification of one or more program features that significantly contributed to the generated program recommendation score; and
   updating said user profile with said feedback information.

2. The method as claimed in claim 1, wherein said step of requesting feedback further comprises the steps of placing at least one feedback request in a log file and presenting said feedback request to said user at a later time adapted for reducing obtrusiveness of the feedback request.

3. The method as claimed in claim 2, wherein said feedback requests are presented in a given session during said step of presenting said feedback request based on timing determined by a user-specified parameter only if said content selection is inconsistent with said preferences.

4. The method as claimed in claim 2, wherein said feedback requests are presented in a given session during said step of presenting said feedback request based on timing determined by predetermined criteria only if the program content of said item selection is inconsistent with said preferences.

5. The method as claimed in claim 2, wherein said feedback requests presented in a given session during said step of presenting said feedback request based on timing determined by dynamically determined criteria only if the program content of said item selection is inconsistent with said preferences.

6. The method as claimed in claim 1, wherein said step of requesting feedback information requests said user to provide a scale-based rating of the program content of said item selection only if said program content appears inconsistent with information in said user profile.

7. The method as claimed in claim 1, wherein said step of requesting feedback information requests said user to provide a scale-based rating of the program content of said item selection only if said program content appears inconsistent with the generated program recommendation score.

8. The method as claimed in claim 1, wherein said step of requesting feedback information requests said user to provide a scale-based rating of a content item that is not selected only if said program content appears inconsistent with information in said user profile.

9. The method as claimed in claim 1, wherein said step of requesting feedback information requests said user to provide a scale-based rating of the program content of said item selection only if the generated program recommendation score of said program content is a neutral recommendation score.

10. The method as claimed in claim 1, wherein the generated program recommendation score includes scores from two different recommenders, and said step of requesting feedback information requests said user to provide a scale-based rating of the program content of said item selection only if said program content has been assigned inconsistent recommendation scores by the two different recommenders.

11. A method for updating a user profile stored in a memory, comprising the steps of:
    obtaining, from the memory using a processor, said user profile indicating content preferences of a user;
    comparing, using the processor, said content preferences to a content selection of said user;
    generating recommendation scores, using implicit/explicit recommenders, of content based on the preferences in the user profile;
    requesting feedback information from said user using a user interface if said content selection is inconsistent with said content preferences, wherein said feedback request includes an indication of said generated recommendation score for said content selection that includes an identification of one or more program features that significantly contributed to the generated recommendation score; and
    updating said user profile with said feedback information.

12. The method as claimed in claim 11, wherein said inconsistent selection is a content selection having content features that do not match said user profile.

13. The method as claimed in claim 11, wherein said inconsistent selection is a content selection for which a low recommendation score is generated.

14. The method as claimed in claim 11, wherein said inconsistent selection is failing to make a content selection for which high recommendation score has been generated in favor of one or more content items for which lower recommendation scores are generated.

15. A method for updating a user profile stored in a memory, comprising the steps of:
    establishing, using a processor, a plurality of profile influence rules that dynamically obtain user feedback upon occurrence of predefined criteria;
    comparing, using the processor, said plurality of profile influence rules to behavior;
    generating recommendation scores, using implicit/explicit recommenders, of content based on the preferences in the user profile; and
    requesting feedback from a user using a user interface regarding said content preferences if said predefined criteria of at least one of said profile influence rules is satisfied, wherein said feedback request includes an indication of said generated recommendation score that includes an identification of one or more program features that significantly contributed to the generated recommendation score.

16. The method as claimed in claim 15, wherein said profile influence rules identify user behavior that is inconsistent with content related information recorded in said user profile and said requested feedback is presented only if said behavior is inconsistent with said content preferences.

17. The method as claimed in claim 16, wherein said inconsistent behavior is selecting a content item having content related features that do not match said user profile and said requested feedback is presented only if said behavior is inconsistent with said content preferences.

18. The method as claimed in claim 15, wherein said profile influence rules identify user behavior that is inconsistent with said generated recommendation scores and said requested feedback is presented only if said behavior is inconsistent with said content preferences.

19. The method as claimed in claim 18, wherein said inconsistent user behavior is selecting a content item for which a low recommendation score is generated and said requested feedback is presented only if said behavior is inconsistent with said content preferences.

20. The method as claimed in claim 18, wherein said inconsistent user behavior is failing to select a content item receiving a high recommendation score in favor of one or more content items receiving lower recommendation scores and said requested feedback is presented only if said behavior is inconsistent with said content preferences.

21. The method as claimed in claim 15, wherein said profile influence rules cause a neutral recommendation score to be generated and said requested feedback is presented only if said behavior is inconsistent with said content preferences.

22. The method as claimed in claim 15, wherein said profile influence rules cause inconsistent recommendation scores to be generated and said requested feedback is presented only if said behavior is inconsistent with said content preferences.

23. The method as claimed in claim 22, wherein said inconsistent recommendation scores are generated by two different recommenders and said requested feedback is presented only if said behavior is inconsistent with said content preferences.

24. The method as claimed in claim 15, wherein said profile influence rules specify how said feedback should be employed to update said user profile and said requested feedback is requested at a time adapted for reducing obtrusiveness of the feedback request.

25. The method as claimed in claim 15, wherein said profile influence rules have an associated feedback request command adapting appropriate information that should be requested in order to influence said used profile at a time adapted for reducing obtrusiveness of the feedback request.

26. A method for updating a user profile stored in a memory, comprising the steps of:

establishing, using a processor, a plurality of profile influence rules that dynamically obtain user feedback upon occurrence of predefined criteria;

generating recommendation scores, using implicit/explicit recommenders, of content based on content related preferences in the user profile;

comparing, using the processor, said plurality of profile influence rules to generated content related recommendation scores; and requesting feedback from a user using a user interface regarding said content related preferences if said predefined criteria of at least one of said profile influence rules is satisfied, wherein said feedback request includes an indication of said generated recommendation score that includes an identification of one or more program features that significantly contributed to the generated recommendation score.

27. The method as claimed in claim 26, wherein said profile influence rules cause a neutral recommendation score to be generated and said requested feedback is requested only if said behavior is inconsistent with said content preferences.

28. The method as claimed in claim 26, wherein said profile influence rules cause inconsistent recommendation scores to be generated and said requested feedback is requested only if said behavior is inconsistent with said content preferences.

29. The method as claimed in claim 28, wherein said inconsistent recommendation scores are generated by two different recommenders and said requested feedback is requested only if said behavior is inconsistent with said content preferences.

30. The method as claimed in claim 26, wherein said profile influence rules specify how said feedback should be employed to update said user profile and said requested feedback is requested at a time adapted for reducing obtrusiveness of the feedback request.

31. The method as claimed in claim 26, wherein said profile influence rules have an associated feedback request command adapting appropriate information that should be requested in order to influence said used profile and said requested feedback is requested at a time adapted for reducing obtrusiveness of the feedback request.

* * * * *